March 25, 1969  A. GEHRING ET AL  3,435,068
PROCESS FOR THE MANUFACTURE OF p-HYDROXYBENZOIC ACID
Filed Aug. 6, 1965
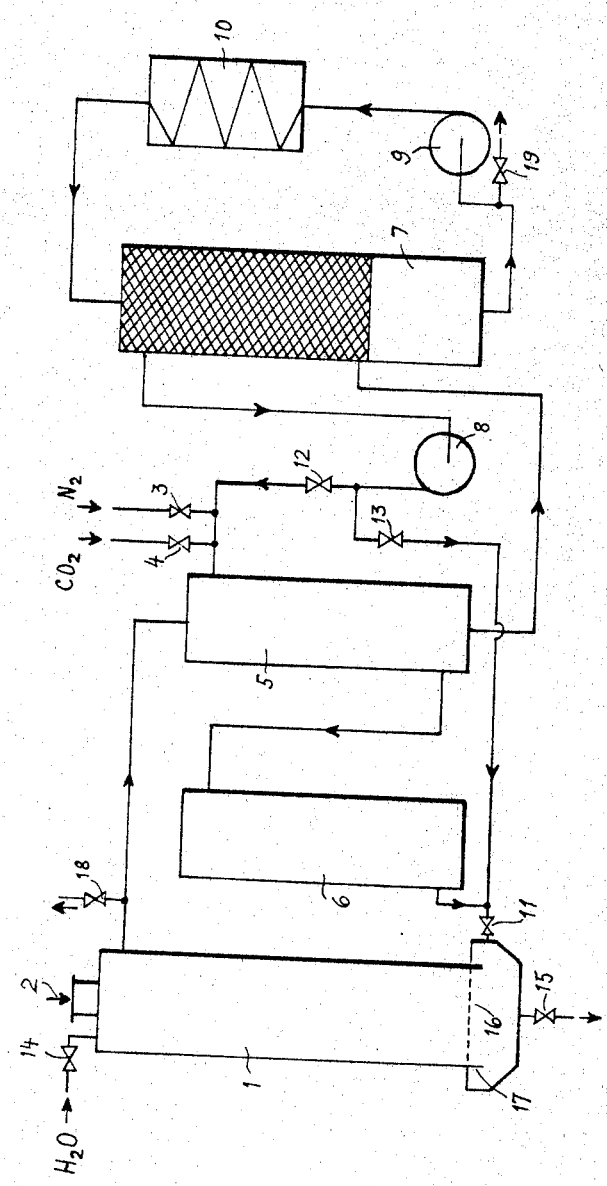
INVENTORS:
Albert Gehring
Richard Sailer

United States Patent Office 3,435,068
Patented Mar. 25, 1969

3,435,068
PROCESS FOR THE MANUFACTURE OF p-HYDROXYBENZOIC ACID
Albert Gehring, Tamins, Grisons, and Richard Sailer, Domat-Ems, Grisons, Switzerland, assignors to Inventa A.G. fur Forschung und Patentverwertung, Zurich, Switzerland
Filed Aug. 6, 1965, Ser. No. 477,845
Claims priority, application Switzerland, Aug. 6, 1964, 10,301/64
Int. Cl. C07c 65/04
U.S. Cl. 260—521                            4 Claims

ABSTRACT OF THE DISCLOSURE

A process for the manufacture of p-hydroxybenzoic acid by reacting the potassium salt of phenol with $CO_2$ at temperatures of 190–210° C. and pressures between 3 and 6 atmospheres gauge, which comprises the improvement of treating the K-phenate in the form of granules or briquettes, whose diameter or length of side ranges from 5 mm. to 30 mm. with a circulated mixture of inert gas and $CO_2$ brought into reaction temperature. p-Hydroxybenzoic acid is employed as a preservative and as an intermediate in the manufacture of plastics.

---

The present invention relates to a process for the manufacture of p-hydroxybenzoic acid.

p-Hydroxybenzoic acid is employed as a preservative and as an intermediate product for the manufacture of plastics.

The commercial production of p-hydroxybenzoic acid is carried out by the Kolbe-Schmitt reaction by causing carbon dioxide to act on potassium phenolate at 180°–220° C. up to a pressure of 5 atmospheres gauge. According to BIOS Report No. 986, this takes place, for example, discontinuously in an autoclave equipped with a powerful stirrer. Carbon dioxide is forced in by stages on top of anhydrous potassium phenolate until a final pressure of 5 atmospheres gauge is reached. When the reaction has come to a stop, the phenol formed from the phenolate as by-product is distilled off in vacuo, whereupon carbon dioxide is forced in again. This procedure is repeated two or three times and the total reaction time for a charge of 4200 kg. is then about 60 hours.

The above-discussed reaction is strongly exothermic. The removal of the heat of reaction proceeds very poorly in the pulverulent or molten reaction mass. The optimum reaction conditions are in a comparatively narrow temperature range, because below about 200° C. o-hydroxybenzoic acid (salicyclic acid) is formed to an increasing extent, and above about 200° C. decomposition reactions already appear. In order to keep the temperature within controllable limits, the addition of carbon dioxide must be regulated very carefully. For the reaction to take place completely and for a reaction product which is as free from phenol as possible to be obtained, thoroughly good mixing of the whole is very important. As the reaction mass becomes periodically viscously plastic, the stirrer and the drive are subjected to very strong stresses. The expenditure on apparatus is therefore relatively heavy.

It has already been proposed to operate with a carbon dioxide/inert gas circulation, while retaining the known apparatus for removing the heat of reaction and the phenol formed. By varying the rate of circulation of the gas and the efficiency of the condenser inserted in the circuit, the temperature in the autoclave can be kept approximately constant ($\pm 8°$ C. in the best case) in spite of the exothermic course taken by the carbonization. The carbonization is complete after about 7 hours; the conversion rate is 65–70% and the yield is about 85% (see French Patent 1,308,774, British Patent 942,418).

Starting from the last method of manufacture described, a process has now been discovered which enables the reaction temperature in the conversion process with which we are concerned here to be maintained very accurately, that is at $\pm 3°$ C. precisely. The reaction can now be carried out in a simple reaction vessel without a stirring apparatus—this simpler constructional form of the reaction vessel produces a saving the cost of purchase and maintenance, and the total reaction time is about 3–4 hours. This shorter reaction time results in a saving of energy consumed and more economic use of the reaction vessel.

The present invention relates, therefore, to a process for the manufacture of p-hydroxybenzoic acid by reacting the potassium salt of phenol with carbon dioxide at 190–210° C. and a pressure of up to 6 atmospheres gauge, wherein potassium phenolate is treated in the form of granules or of briquettes with a diameter or length of side of up to 30 mm., with a circulated mixture of inert gas and carbon dioxide brought to reaction temperature, a quantity of inert gas required for removing the heat of reaction and the free phenol being always present in the circulating mixture; the phenol is then separated in an afterconnecting cooling arrangement and used carbon dioxide is replaced by fresh gas.

A reaction temperature of 200° C. is preferred, that is, therefore, a temperature range of 197–203° C. Nitrogen is most economic as inert gas, but of course another of the series of known inert gases may also be used. While the reaction is carried out, the partial pressure of the carbon dioxide is advantageously increased by stages.

The process according to the present invention may be carried out, for example, as follows:

A reaction vessel which is equipped at the gas inlet with a suitable device for distributing the gas is charged with anhydrous potassium phenolate, which has been made into coarse granules or briquettes. The size of the granules or the briquettes should be so calculated that, on the one hand, it ensures that the reaction gas will still flow around the same satisfactorily, and, on the other hand, permits a complete reaction in the shortest possible time. Preferably, pieces of potassium phenolate with a diameter or length of edge of 5–30 mm. are used.

The gas is conveyed upwardly. At the beginning the potassium phenolate is brought to reaction temperature by inert gas heated by means of a heating device and at the same time any traces of moisture which may still be present are removed; the pressure is 1–5 atmospheres gauge. The addition of the carbon dioxide is then effected. This is so metered that not only the heat of reaction, but also the phenol formed, are immediately carried off. In this way the phenol is prevented from forming a melt with the potassium phenolate and the reaction product, and thus from choking the reaction vessel. For this reason, a start is made with a partial carbon dioxide pressure of 0.1–0.5 atmosphere gauge. The supply can then be increased as the reaction progresses until a total pressure of 2–6 atmospheres gauge is reached. The phenol is separated from the reaction gas in a suitable cooling apparatus, whereupon the gas is supplied to the reaction vessel again by way of a heating device.

For better utilization of the heat, the fresh gas will first be preheated with the waste gas. A direct cooling means, for example a phenol washing tower, can be used as the cooling means for the reaction gas. Of course, other cooling systems can also be employed.

After the reaction has been completed, the reaction mass is cooled to about 100° C. by conveying the circulating gas into the reaction vessel after by-passing the heating means. After the pressure of the pressure system has been released, the reaction product is drawn off into a dissolving vessel or dissolved out directly with water. The p-hydroxybenzoic acid can be recovered from the solution of the reaction product in the conventional manner by neutralization, purification and acidification.

The process according to the present invention can also be made semi-continuous by connecting a second reaction vessel in parallel in the gas circuit. While one of the two reaction vessels is emptied and charged, the other reaction vessel is in operation. The heat of the reaction vessel which is to be cooled can be utilized to heat the freshly charged reaction vessel by suitable control of the gas circuit. In this case, the pressure of the reaction vessel in which the reaction has been completed must be released prior to cooling.

The following example is intended to illustrate the process according to the present invention more fully without however in any way limiting the same thereby. The percentages given are percentages by weight and the temperatures are given in ° C. Reference is made to the accompaying drawing which illustrates the process of the invention in a schematic view.

Example 800 kg. of anhydrous potassium phenolate in the form of pieces with an edge length of 15 mm. and a thickness of 5 mm. are fed, by way of a filling connection 2, into a 1000 liter reaction vessel 1, which is equipped with a sieve plate 16 and a baffle plate 17 for the distribution of the gas. $N_2$ at a pressure of 3 atmospheres gauge is now forced in by way of the $N_2$ valve 3. The gas enters the reaction vessel by way of a heat exchanger 5 and an electric preheater 6. heats up the potassium phenolate therein and in so doing, at the same time removes traces of moisture. From the reaction vessel, the gas again passes into the heat exchanger 5 and from there into a cooler 7. The cooled gas is returned to the circuit by a blower 8. The blower has a capacity of 10 mm.³/min. The cooler is a phenol washing tower filled in the upper portion with Raschig rings. The phenol is kept in circulation by a pump 9 and is kept at 45–50° C. by a cooler 10. After about 1 hour, a temperature of 200° C. is reached in the reaction vessel. The pressure is now increased to 3.5 atmospheres gauge with dry $CO_2$ gas by way of a valve 4. The temperature in the reaction vessel increases by at most 3° C. and the phenol formed is condensed in the phenol washing tower. After the pressure has dropped to 3 atmospheres gauge at any given time, it is made up of 3.5 atmospheres gauge again and again with $CO_2$. After 1 hour, the addition of $CO_2$ is then increased to 4 atmospheres gauge, and, finally, after 2 hours, it is brought to 5 atmospheres gauge. After about 3 hours, the pressure remains constant, that is the reaction has been completed. By opening a valve 13 and closing a valve 12, the cold gas is conveyed directly into the reaction vessel, and, after about 1 hour, the reaction product has been cooled to 80–100° C. The pressure in the apparatus is released by way of a valve 18 and the phenol originating from the reaction is removed by way of a valve 19. 208 kg. of phenol are recovered. The reaction product itself still contains 0.3% of phenol. After a valve 11 has been closed, water is passed into the reaction vessel by way of a valve 14. The reaction product is dissolved very rapidly and the solution is removed by way of a valve 15. The p-hydroxybenzoic acid is thereupon recovered by neutralization, purification, if necessary, with activated carbon and reducing agents and precipitation by means of mineral acids. 494 kg. of p-hydroxybenzoic acid are obtained, which means a yield of 93%, calculated on converted phenolate, and 59.1% calculated on the phenolate used. The acid obtained is free from salicylic acid.

What we claim is:

1. In a process for the manufacture of p-hydroxybenzoic acid by reacting the potassium salt of phenol with carbon dioxide at 190–210° C. and a pressure of from 3 atmospheres up to 6 atmospheres gauge, the improvement which comprises treating said potassium phenolate in the form of granules or in the form of briquettes with a diameter or length of side in the range of 5 mm. up to 30 mm. with a circulated mixture of inert gas and carbon dioxide brought to reaction temperature, maintaining in the circulated mixture at all times a quantity of inert gas required for removing the heat of reaction and the free phenol formed in the reaction, separating the phenol by cooling, and replacing used carbon dioxide by fresh gas.

2. Process according to claim 1, wherein the reaction temperature is in the range of 197–203° C.

3. Process according to claim 1, wherein nitrogen is employed as inert gas.

4. Process according to claim 1, wherein during the reaction the partial $CO_2$ pressure is increased by stages.

References Cited

UNITED STATES PATENTS

| 3,187,037 | 6/1965 | Geisen et al. | 260—521 |
| 407,906 | 7/1889 | Seifert | 260—521 |

LORRAINE A. WEINBERGER, *Primary Examiner.*

D. STENZEL, *Assistant Examiner.*